(12) United States Patent
Sackett et al.

(10) Patent No.: US 7,660,267 B2
(45) Date of Patent: Feb. 9, 2010

(54) HOMING OF USER NODES TO NETWORK NODES IN A COMMUNICATION SYSTEM

(75) Inventors: Raymond Abbott Sackett, Rumson, NJ (US); Carlos Urrutia-Valdes, Tinton Falls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 189 days.

(21) Appl. No.: 12/015,287

(22) Filed: Jan. 16, 2008

(65) Prior Publication Data

US 2009/0180397 A1 Jul. 16, 2009

(51) Int. Cl.
*H04L 12/28* (2006.01)
(52) U.S. Cl. .................. 370/254; 370/255; 370/401; 370/412; 709/201; 709/203; 709/217; 709/219
(58) Field of Classification Search ................ None
See application file for complete search history.

(56) References Cited

U.S. PATENT DOCUMENTS

2004/0252646 A1* 12/2004 Adhikari et al. ............ 370/252
2006/0190521 A1* 8/2006 Kojima ...................... 709/200
2007/0189268 A1* 8/2007 Mitra et al. ................. 370/352
2008/0194255 A1* 8/2008 Walker et al. ............... 455/433
2008/0225714 A1* 9/2008 Denis ......................... 370/232
2008/0280623 A1* 11/2008 Danne et al. ................ 455/453

OTHER PUBLICATIONS

J. Rosenberg et al., "SIP: Session Initiation Protocol," Internet Engineering Task Force (IETF) RFC 3261, Jun. 2002, pp. 1-26.

* cited by examiner

*Primary Examiner*—Pankaj Kumar
*Assistant Examiner*—Ajay P Cattungal
(74) *Attorney, Agent, or Firm*—Ryan, Mason & Lewis, LLP

(57) ABSTRACT

User nodes are homed to network nodes in an IMS network or other communication system by determining a function hierarchy for functions provided by the network nodes. Starting with a function at an initial level of the function hierarchy, a predetermined criterion such as throughput-weighted distance is applied to assign a given user node to a particular network node providing that function. The homing process then proceeds through one or more additional levels of the function hierarchy to assign the given user node to at least one additional network node providing at least one other function identified in the additional level(s) of the function hierarchy. These operations are repeated for one or more additional user nodes until each of the user nodes is homed to one or more of the network nodes providing all of its required functions.

20 Claims, 8 Drawing Sheets

HOMING OF USER NODES TO NETWORK NODES IN A COMMUNICATION SYSTEM

FIELD OF THE INVENTION

The present invention relates generally to communication systems, and more particularly to user node homing techniques for use in next-generation networks and other types of communication systems.

BACKGROUND OF THE INVENTION

An example of a known type of next-generation network is the IP (Internet Protocol) Multimedia Subsystem (IMS), a next-generation core network architecture for mobile and fixed services, defined by the 3rd Generation Partnership Project (3GPP). See, for example, the 3GPP Technical Specification (TS) documents, including 22.228, 22.250, 22.340, 22.800, 23.218, and 23.228, which are incorporated by reference herein. An IMS network utilizes Session Initiation Protocol (SIP) as a signaling protocol for establishing, modifying and terminating multimedia sessions between users in the network. SIP is described in, for example, J. Rosenberg et al., "SIP: Session Initiation Protocol," Internet Engineering Task Force (IETF) RFC 3261, June 2002, which is incorporated by reference herein.

A network element that processes and forwards SIP messages is called a proxy server in SIP terminology, and a Call Session Control Function (CSCF) in IMS terminology. 3GPP defines three types of CSCF elements: Proxy CSCF (P-CSCF) which is the interface to the user, Interrogating CSCF (I-CSCF) which provides an interface to other servers in different administration domains, and Serving CSCF (S-CSCF) which handles registration, enforces policy and provides an interface to application servers.

In designing any network, it is important to create a topology that will satisfy the demands of the network operator. One key step in creating a topology involves assigning user nodes to specific network nodes so as to provide the users with required functions. A user node may be, for example, a point of interconnection where traffic from several users is aggregated. A network node may be, for example, an entity in the network that provides a particular network function required by a user. The process of assigning user nodes to network nodes is generally referred to herein as "homing."

A problem that arises in conventional network design techniques is that certain features of next-generation architectures such as IMS can complicate the process of homing user nodes to network nodes. For example, the IMS architecture generally separates transport, media, session and application functions into different layers, which makes it much more difficult to determine an appropriate homing of the user nodes to the network nodes than in a network which does not exhibit such separation of functionality. Nonetheless, there is no suitable automated procedure available for performing the homing process in IMS networks and other next-generation networks. Instead, this homing process is often implemented manually, and is therefore extremely time consuming and prone to error.

Accordingly, a need exists for an improved approach to homing of user nodes to network nodes in IMS networks and other types of communication systems.

SUMMARY OF THE INVENTION

In one aspect of the invention, user nodes are homed to network nodes in an IMS network or other communication system by determining a function hierarchy for functions provided by the network nodes. Starting with a function at an initial level of the function hierarchy, a predetermined criterion such as throughput-weighted distance is applied to assign a given user node to a particular network node providing that function. The homing process then proceeds through one or more additional levels of the function hierarchy to assign the given user node to at least one additional network node providing at least one other function identified in the additional level(s) of the function hierarchy. These operations are repeated for one or more additional user nodes until each of the user nodes is homed to one or more of the network nodes providing all of its required functions.

The function hierarchy may be determined by arranging the functions provided by the network nodes in one or more parent-child relationships based on message flow or other criteria. For example, the function hierarchy may comprise a plurality of parent-child relationships each associated with a corresponding functional plane of the network nodes. As a more specific example, a function hierarchy in the case of an IMS network may be determined by grouping the functions into multiple planes, such as a control plane, a media plane, an application plane and a support systems plane, and then determining parent-child relationships for each of the planes separately. Based on this approach, the parent-child relationship for the control plane may comprise a P-CSCF function as a parent having an S-CSCF function as its child. The parent-child relationship for the control plane may further include the S-CSCF function as a parent having an I-CSCF function as its child. Parent-child relationships may be determined for the other planes in a similar manner, in order to form the function hierarchy that is used in the above-described homing process.

In another aspect of the invention, the user nodes may be segmented into sets of user nodes, with assignment of the user nodes to the network nodes being performed on a per-set basis. This technique can be used, for example, to ensure that at least a specified minimum number of network nodes are selected to provide a given function. The sets of user nodes may be ranked based on total traffic associated with their respective required functions, with the particular set of user nodes having the highest total traffic being assigned first among the sets of user nodes.

The illustrative embodiments advantageously allow user nodes to be homed to network nodes in a particularly efficient manner, even in complex architectures such as IMS networks, thereby improving system performance.

DETAILED DESCRIPTION OF THE INVENTION

The invention will be described herein in conjunction with illustrative embodiments of communication systems and associated techniques for homing of user nodes to network nodes. It should be understood, however, that the invention is not limited to use with the particular communication systems and techniques described, but is instead more generally applicable to any type of communication system application in which it is desirable to provide improved efficiency in a user node homing process.

Figure 1:
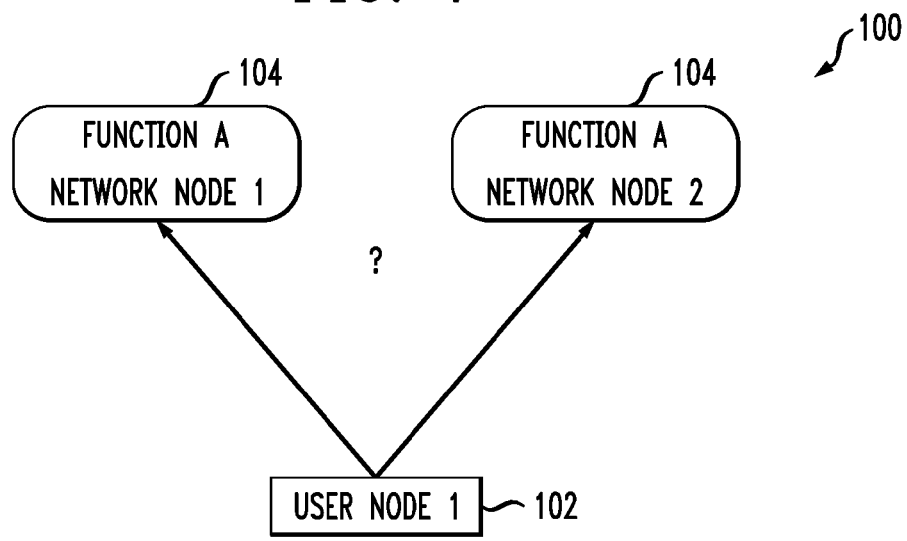
FIGS. 1 and 2 illustrate issues relating to the homing of user nodes to network nodes that are addressed in embodiments of the invention.

Referring now to FIG. 1, a simple example is shown to illustrate the homing of a user node to a network node. A portion of a communication system 100 includes a user node 102 also denoted User Node 1 and two network nodes 104 also denoted Network Node 1 and Network Node 2. The user node 102 is a point of interconnection where traffic from several user devices is aggregated, and may be, for example, a Gateway General Support Node (GGSN), an edge router, or a Packet Data Serving Node (PDSN). The network nodes 104 are entities in the network that provide a network function required by the user. In this simple example, there are two choices where the operator could home User Node 1. More specifically, User Node 1 requiring Function A may be homed to either Network Node 1 or Network Node 2, since both of those network nodes provide the required function.

The term "homing" in this context and elsewhere herein should be understood to refer generally to the assignment of a particular user node to a network node in a manner that allows the latter to provide one or more functions required by the former.

Figure 2:
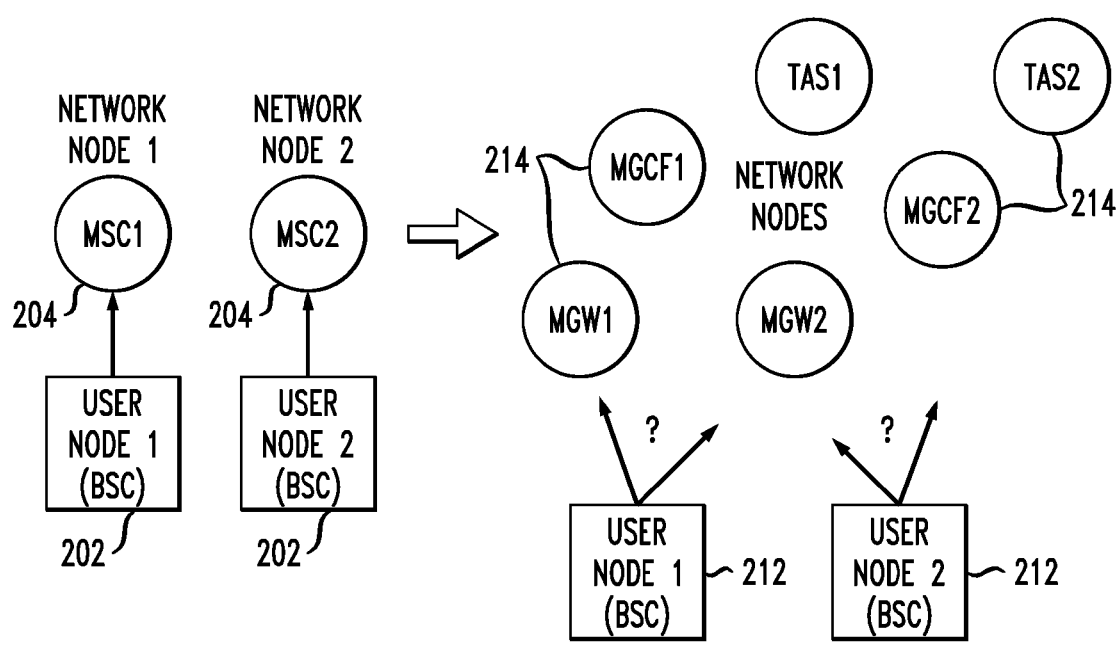

As mentioned previously, additional complexity arises in next-generation architectures such as IMS in which transport, media, session and application functions are separated into different layers. FIG. 2 illustrates the difference in homing between a typical wireless network on the left, and a more complex next-generation network on the right. In this example, a given user node 202 is defined as a point of aggregation of traffic into the network and is associated with a physical location, and more specifically comprises a Base Station Controller (BSC). A given network node 204 is also associated with a physical location and it implements a network function needed to provide the user assigned to this node with a specific service. More specifically, a given network node 204 in the network on the left comprises a Mobile Switching Center (MSC). Each of the network nodes 204 in this example has all the functions required by the user nodes 202, so the assignment is straightforward. Typically, an operator will simply home a given user node to its closest network node.

In the next-generation network on the right side of FIG. 2, however, the functions required by user nodes 212 are distributed over many network nodes 214. A given one of these network nodes 214 may illustratively comprise a Media Gateway (MGW), a Media Gateway Control Function (MGCF), or a Telephony Application Server (TAS). The homing process is now much more complex, and use of conventional approaches is time consuming and prone to error, particularly for large networks which may contain hundreds of nodes. Embodiments of the invention to be described below provide improved user node homing techniques that avoid the problems of conventional practice, and are particularly well suited for use with large networks configured using next-generation architectures such as IMS.

A number of preliminary operations are typically carried out prior to performance of the homing process. First, users are homed to corresponding user nodes. Each user node will have as an attribute its physical location, specified by latitude and longitude coordinates. Other possible attributes for a given user node may include, for example, number of users, throughput per function, registered users per function, etc. Second, network functions are mapped to network nodes. This process is referred to as function mapping. A given network node will generally have as attributes its physical location, specified by latitude and longitude coordinates, and the network function(s) that it provides. These particular preliminary operations should not be viewed as requirements of the invention, and other embodiments may be implemented in a manner that, for example, uses alternative operations, combines one or more such operations with the homing process itself, etc.

The homing process in the present embodiment is as follows.

1. Arrange the required network functions in a hierarchy that comprises one or more parent-child relationships. Generally, the lowest level of the hierarchy is considered a parent function, while the higher levels are child functions. It should be noted that in a hierarchy with more than two levels, a given child function may itself be a parent function relative to other child functions.

2. Starting with the function at the lowest level of the hierarchy, apply one or more predetermined criteria (e.g., distance, throughput, throughput-weighted distance, etc.) to assign a given user node to a particular network node providing that function.

3. Proceed to the next level in the hierarchy, again applying one or more predetermined criteria, preferably the same used in Step 2, to assign the given user node to a particular network node providing the corresponding function.

4. Repeat Step 3 for any remaining functions at that level or other levels in the hierarchy until the given user node has been assigned to one or more network nodes providing all of its required functions.

5. Repeat Steps 2, 3 and 4 for other user nodes until all user nodes have been assigned to network nodes providing their required functions.

It may be helpful in certain implementations to segment the functions into groupings also referred to herein as "planes," with the hierarchy including one or more separate parent-child relationships determined for each of the planes. For such an implementation, Steps 2, 3 and 4 are repeated for a given user node for each of the planes that include functions required by that user node.

A particular implementation of the above-outlined homing process will now be described with reference to an exemplary IMS network 300 shown in FIG. 3. The IMS network 300 illustratively comprises four user nodes 302 that are to be homed to one or more network nodes 304 that provide various functions required by the user nodes. The numbers associated with the respective names of the network nodes 304 may be viewed as indicating corresponding network locations, and additional sets of similar network nodes not explicitly shown may be associated with other locations.

In accordance with Step 1 of the illustrative homing process, the required functions are arranged into a function hierarchy comprising one or more parent-child relationships. For this particular example, the homing process is considerably facilitated by segmenting the various IMS functions into the following four planes:

Control plane: P-CSCF, S-CSCF, I-CSCF, Breakout Gateway Control Function (BGCF), MGCF, Multimedia Resource Function Controller (MRFC)

Media plane: MGW, Multimedia Resource Function Processor (MRFP)

Application plane: Application Server (AS)

Support Systems plane: Home Subscriber Server (HSS), Domain Name Service (DNS)

It is to be appreciated that this particular grouping of IMS network node functions into planes is presented by way of illustrative example only, and other groupings may be used in alternative embodiments.

Figure 3:
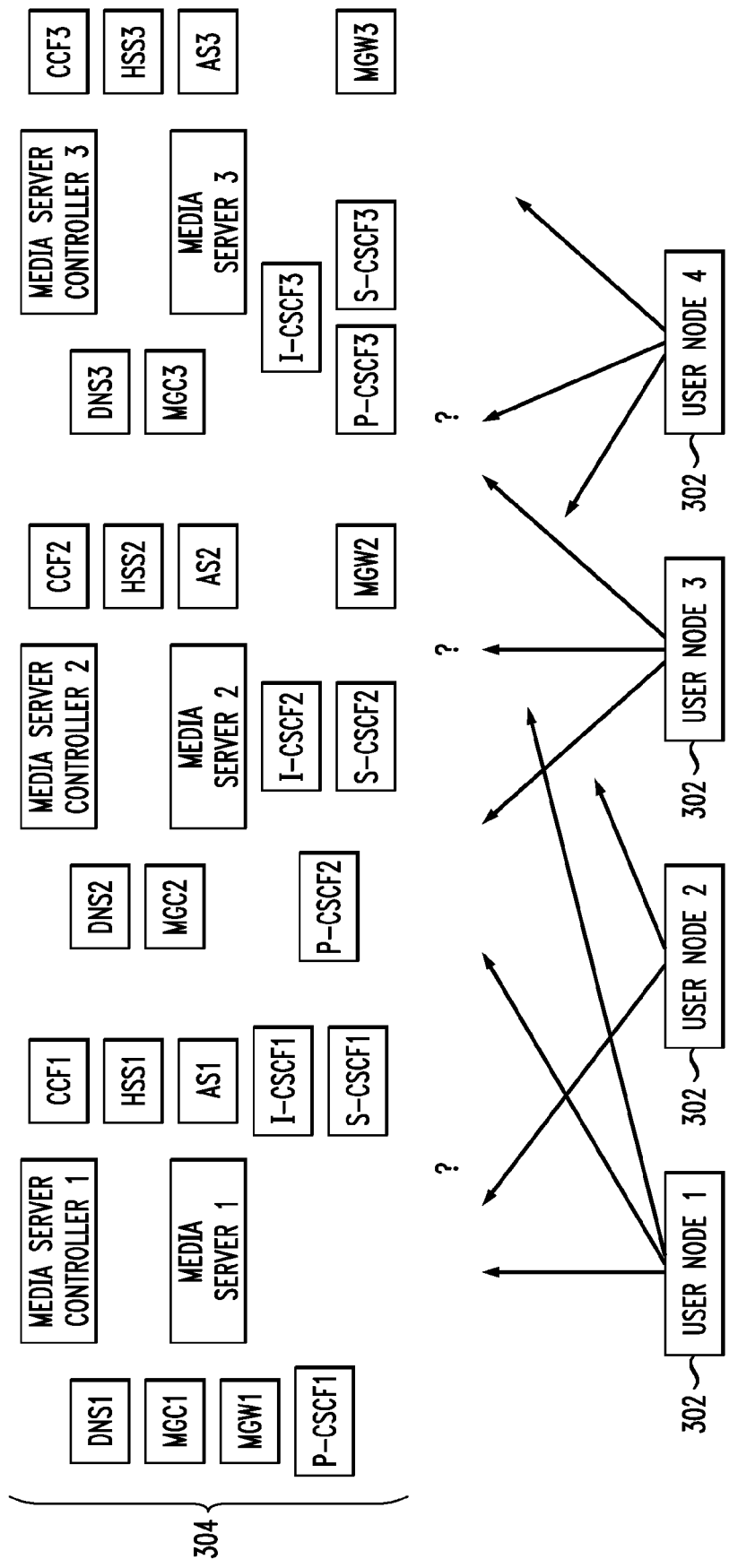
FIG. 3 shows an example of an IMS network to which a user node homing process is applied in one embodiment of the invention.

Also, it should be noted that the IMS network 300 of FIG. 3 includes one or more functions not included in the above groupings, such as Call Control Function (CCF).

The criterion used to determine the parent-child relationships of the function hierarchy for a given plane in this embodiment is message flow between the various functions of that plane. In other embodiments, one or more alternative criteria may be used, in place of or in combination with message flow criterion.

The particular manner in which the parent-child relationships of the function hierarchy are determined for each of the four planes identified above will now be described. The parent-child relationships of the function hierarchy for these four planes are illustrated in FIGS. 4A through 4D, respectively.

Control Plane

The control plane includes the P-CSCF, S-CSCF, I-CSCF, MRFC, BGCF and MGCF functions. All control traffic goes through the P-CSCF function and therefore this function is made the lowest level parent function for the control plane portion of the function hierarchy.

Also, the P-CSCF always forwards the messages to the S-CSCF, so the S-CSCF is made a child of the P-CSCF.

The I-CSCF is queried by either the P-CSCF or the S-CSCF, but because the S-CSCF queries I-CSCF more frequently than the P-CSCF does, the I-CSCF is made a child of the S-CSCF.

Figure 4A:
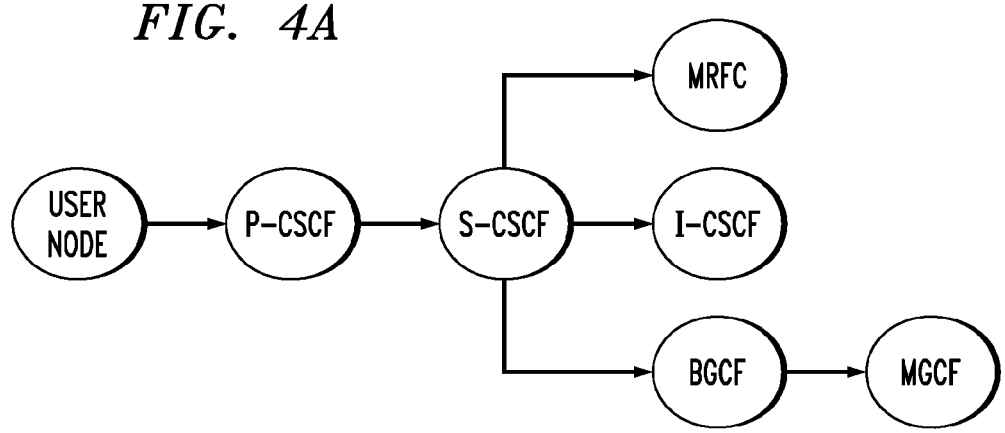
FIGS. 4A to 4D show portions of a function hierarchy including parent-child relationships established for IMS functions grouped into respective control, media, application, and support systems planes.

Similarly, because both the MRFC and the BGCF communicate extensively with the S-CSCF, the MRFC and BGCF are made children of the S-CSCF. The BGCF in turn becomes the parent for the MGCF for similar reasons. The resulting parent-child relationships for the control plane are shown in FIG. 4A.

Media Plane

Figure 4B:
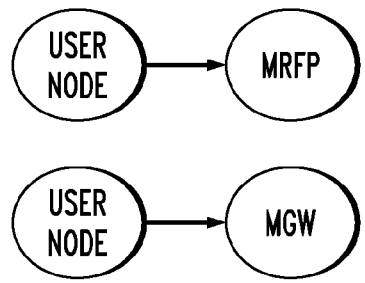

The media plane includes the MRFP and MGW functions. Because the user node communicates directly with both of these functions, each of them is made a separate parent function with no children as shown in FIG. 4B.

Application Plane

Figure 4C:
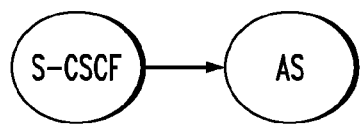

The application plane includes the AS functions. The AS is made a child of parent S-CSCF because all user communication has to flow through the S-CSCF to reach the AS. The resulting parent-child relationship is shown in FIG. 4C.

Support Systems

Figure 4D:
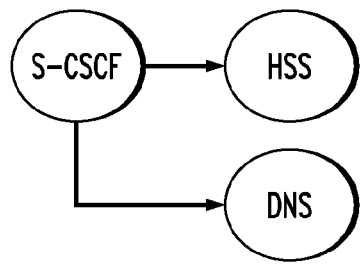

The support systems plane includes the HSS and DNS functions. HSS is made a child of parent S-CSCF because of the extensive communication between these functions. DNS is made a child of S-CSCF for similar reasons. FIG. 4D shows the resulting parent-child relationships.

Figure 5:
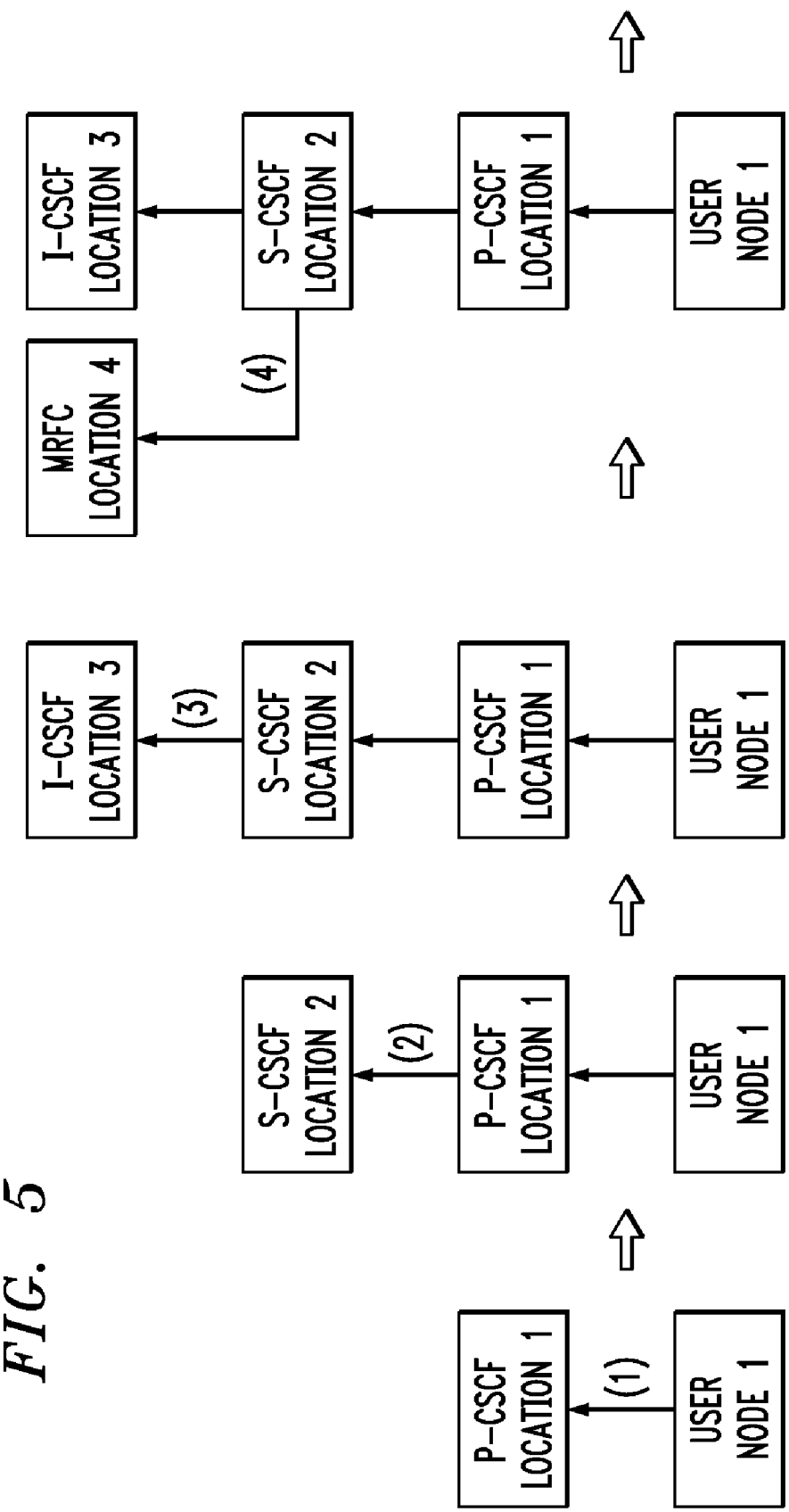
FIG. 5 illustrates an exemplary process for the homing of user nodes to network nodes based on the function hierarchy of FIGS. 4A to 4D.
Figure 5:
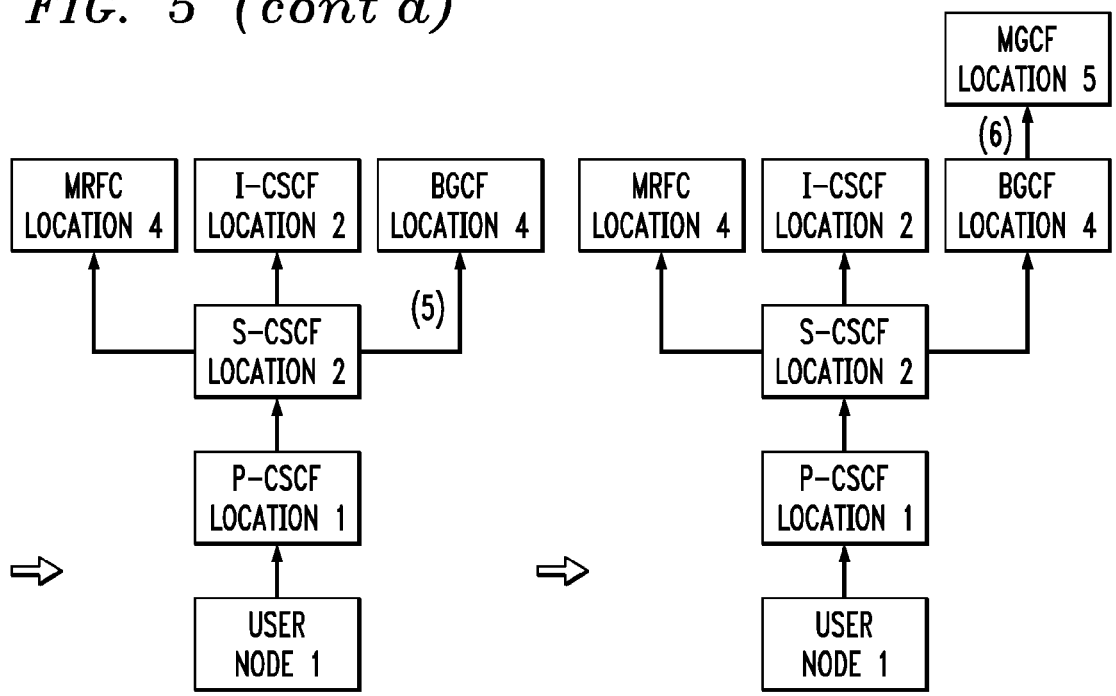
Figure 5:
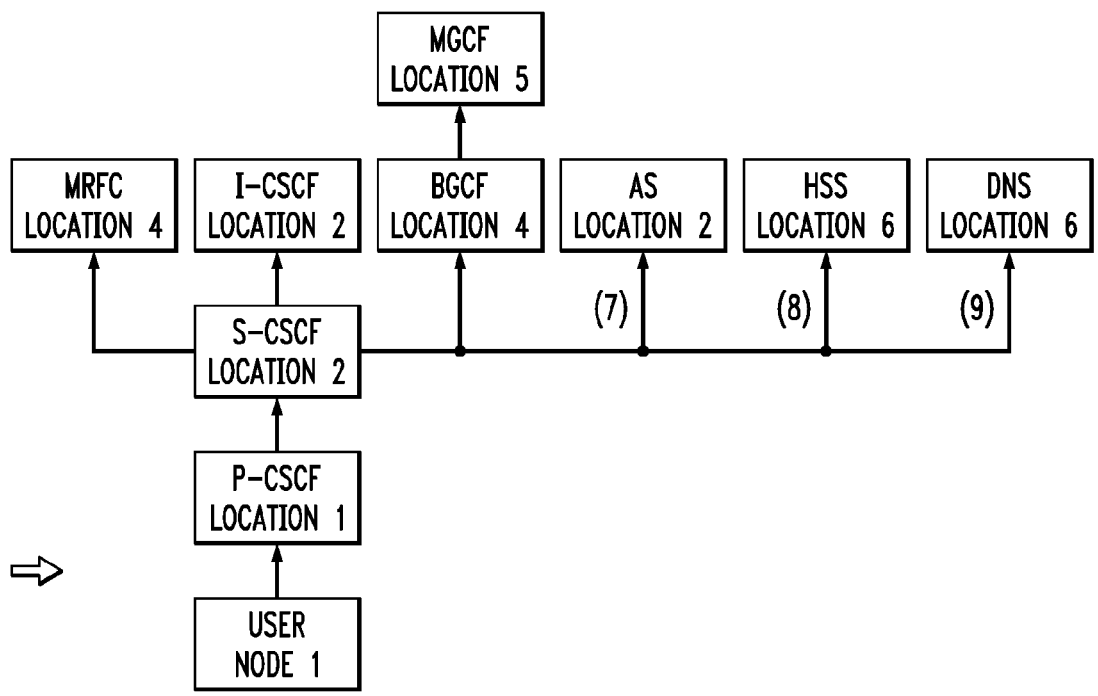

FIG. 5 illustrates Steps 2, 3 and 4 of the homing process for a particular user node, namely User Node 1 of the network 300 in FIG. 3, based on the function hierarchy shown in FIGS. 4A through 4D. The criterion utilized for selecting network nodes in this embodiment is throughput-weighted distance. The throughput-weighted distance is equal to the distance from the user node to the network node in question, times the traffic to the required function. This is an appropriate criterion because performance is usually dependent on distance and cost on traffic loads. Also, the farther away the functions are, the less likely an operator is able to control them. Again, alternative criteria may be used in other embodiments. Network nodes that provide a given function such as P-CSCF may be referred to below as P-CSCF nodes, for simplicity of notation. It should be understood, however, that a given network node may provide multiple functions. Also, as noted previously, a given network node has as an attribute its physical location. Thus, multiple functions associated with a common physical location may be provided by the same network node. It will be assumed that there are at least six distinct locations for network nodes in this particular example, although higher or lower numbers of locations may be used.

Step 2 starts with the P-CSCF, which is the lowest level of the function hierarchy for the control plane. The throughput-weighted distance between User Node 1 and each of the possible network nodes providing the P-CSCF function (i.e., P-CSCF nodes) is calculated, and the network node that yields the minimum throughput-weighted distance is selected. In this case, the throughput-weighted distance to a given one of the P-CSCF nodes will be the distance from User Node 1 to that P-CSCF node, multiplied by the total traffic generated by the user node to the P-CSCF.

With reference to assignment (1) of FIG. 5, the network node at Location 1 is selected to provide the P-CSCF function for User Node 1.

The process then moves to Step 3 to select a network node that provides the S-CSCF, which is the next level in the function hierarchy for the control plane. The throughput-weighted distance between User Node 1 and each of the possible network nodes providing the S-CSCF function (i.e., S-CSCF nodes) is calculated, and the network node that yields the minimum throughput-weighted distance is selected. In this case, the throughput-weighted distance to a given one of the S-CSCF nodes will be the distance from User Node 1 to that S-CSCF node, multiplied by the total traffic generated by the user node to the S-CSCF.

With reference to assignment (2) of FIG. 5, the S-CSCF node at Location 2 is selected to provide the S-CSCF function for User Node 1.

The process continues with Step 4, which involves repeating Step 3 for any remaining functions in the hierarchy until User Node 1 has been assigned to one or more network nodes providing all of its required functions. As a result, again with reference to the diagram of FIG. 5, User Node 1 is assigned to the I-CSCF node at Location 3, as indicated at (3), to the MRFC node at Location 4, as indicated at (4), to the BGCF node at Location 4, as indicated at (5), to the MGCF node at Location 5, as indicated at (6), to the AS node at Location 2, as indicated at (7), to the HSS node at Location 6, as indicated at (8), and to the DNS node at Location 6, as indicated at (9).

Figure 6:
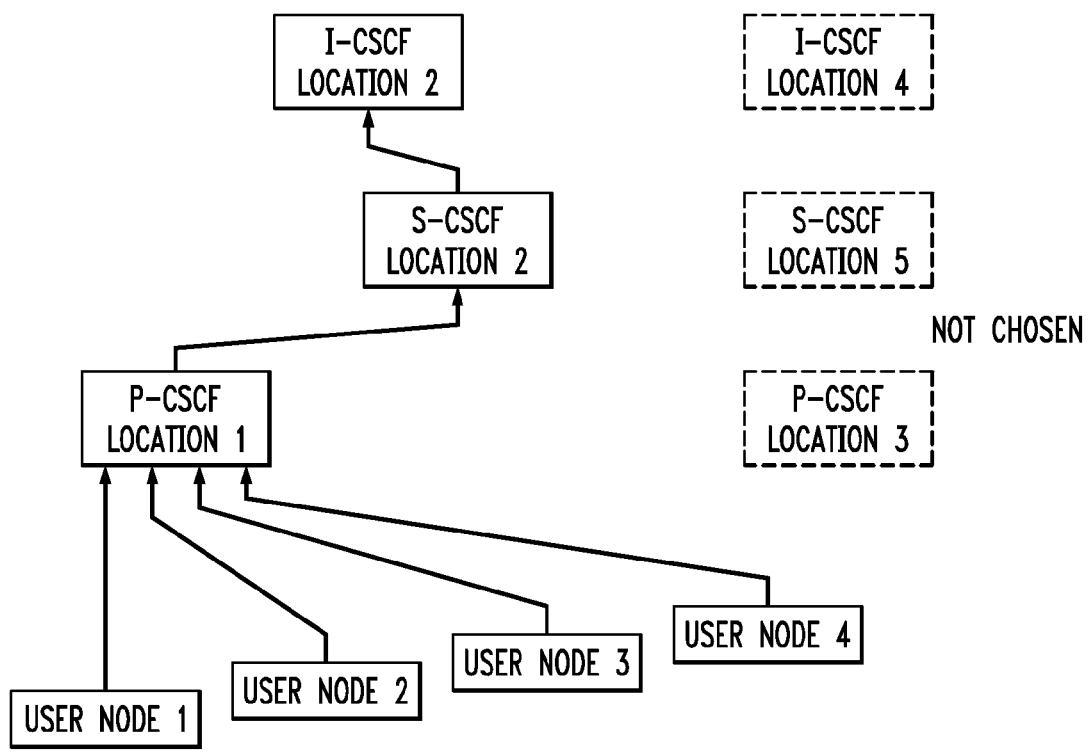
FIG. 6 shows a control plane portion of a possible homing arrangement resulting from the process of FIG. 5.

The process is then repeated for other user nodes until all user nodes are homed to the required functions. One possible assignment for all four user nodes of the FIG. 3 network is shown in FIG. 6. Only the P-CSCF, S-CSCF, and I-CSCF functions of the control plane are shown for clarity.

In the example of FIG. 6, the number of network node locations that may be used to provide a given function is not predetermined. Thus, only a single P-CSCF node, namely, the P-CSCF node at Location 1, was selected in this example. However, it is possible that an operator may want to use two distinct P-CSCF nodes to provide that function for a given set of user nodes. This can be achieved using a technique referred to herein as user node segmentation, as will now be described in conjunction with FIGS. 7 and 8.

Figure 7:
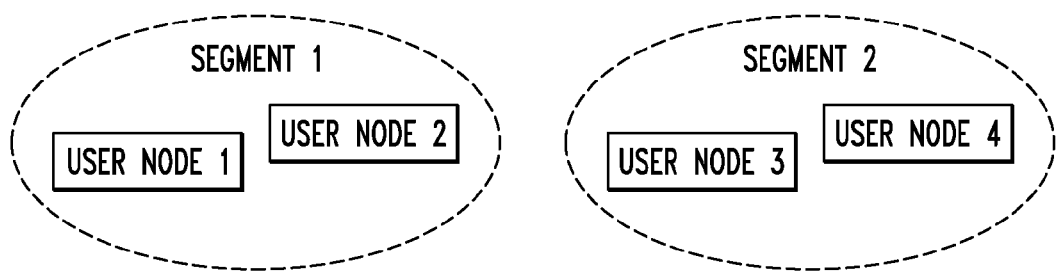
FIGS. 7 and 8 illustrate modifications to the homing process to accommodate user node segmentation.

Generally, user nodes are segmented into sets prior to application of steps similar to those of the above-described homing process. For example, in the network 300 with four user nodes, the user nodes would have to be divided into two groups to ensure that two distinct P-CSCF nodes are chosen. FIG. 7 illustrates a possible segmentation of the user nodes into two groups, although numerous other segmentation techniques may be applied, as will be appreciated by those skilled in the art. The groups resulting from user node segmentation are also referred to herein as sets or segments. The process of user node segmentation is also referred to herein as user node set construction.

Once the user nodes are segmented, substantially the same homing process is applied but instead of being performed on a user node basis, it is performed on a user node segment basis with an additional modification as described below.

Figure 8:
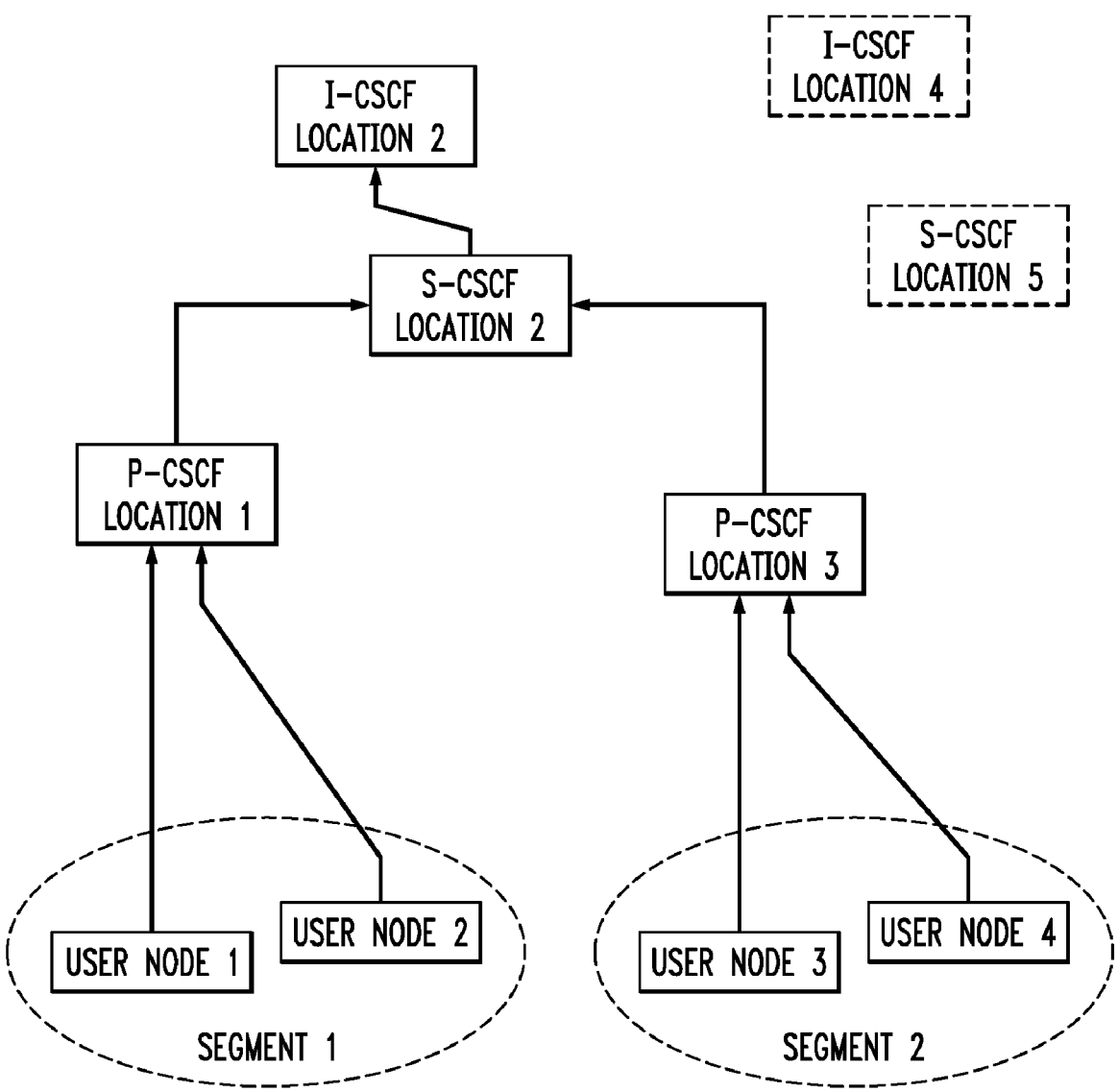

Assume that User Node 1 and User Node 2 are in one segment and User Node 3 and User Node 4 are in another one, as shown in FIG. 7. All the nodes in each segment are considered as one in the modified homing process. Furthermore, the segments are ranked and then processed separately in order to ensure a desired number of P-CSCF nodes. By way of example, the total traffic load may be calculated for each segment, and the process may begin with the segment having the highest traffic load, i.e., with the "heaviest" segment. Assuming that in the present example Segment 2 is heavier than Segment 1, the homing process begins with Segment 2 and selects the P-CSCF node that yields the minimum total throughput-weighted distance. Once that P-CSCF node is chosen it is eliminated from the list of possible P-CSCFs nodes. This will ensure that Segment 1 is not assigned the same P-CSCF node as Segment 2. The process continues until all segments are homed. One possible result for the P-CSCF, S-CSCF and I-CSCF functions is shown in FIG. 8.

As can be seen, two P-CSCF locations were chosen but only one S-CSCF was chosen. If the user wanted a larger number of S-CSCFs, the same procedure will be repeated for each of the children.

Figure 9:
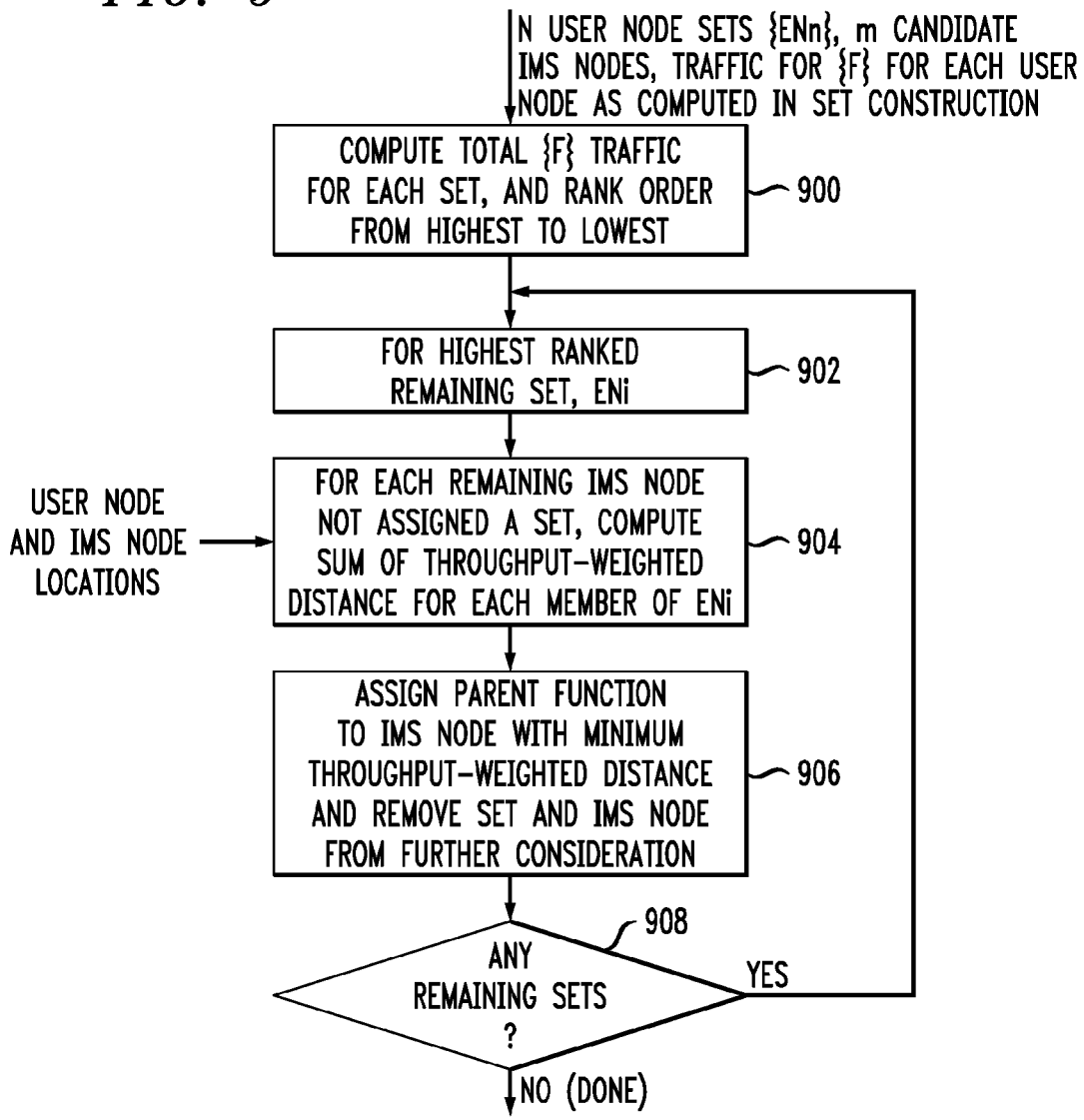
FIG. 9 is a flow diagram illustrating the user node homing process in an illustrative embodiment.

The flow diagram of FIG. 9 illustrates an exemplary homing process with user node segmentation. In this diagram, the user node segments are referred to as sets. Input to step 900 includes N user node sets ENn, m candidate network nodes, also referred to as IMS nodes in this example, and traffic for functions {F} as computed in a set construction phase. Step 900 computes the total {F} traffic for each set, and ranks the sets in order of total {F} traffic from highest to lowest. Step 902 identifies the highest ranked remaining set, denoted ENi, and the process then moves to step 904. Step 904 receives as input the user node and IMS node locations, and for each remaining IMS node not assigned a set, computes the sum of the throughput-weighted distances to that IMS node for the user nodes in the set ENi. Step 906 then assigns a parent function from the function hierarchy to the IMS node; with the minimum throughput-weighted distance, and removes the set ENi and the IMS node from further consideration. Step 908 determines if there are any remaining sets of user nodes to be processed. If there are, the process returns to step 902 to process the next set, and otherwise ends as indicated. Steps similar to those of the FIG. 9 process may be applied for each of the other functions in the relevant function hierarchy, until the remaining user nodes are homed to network nodes providing the required functions.

A given user node homing process as described herein may be implemented in a computer or other processing device comprising a processor and a memory. For example, a homing process of the type described herein may be embodied in the form of a network design tool or other type of software program that is stored in a memory of a processing device and executed by a processor of that processing device.

Figure 10:
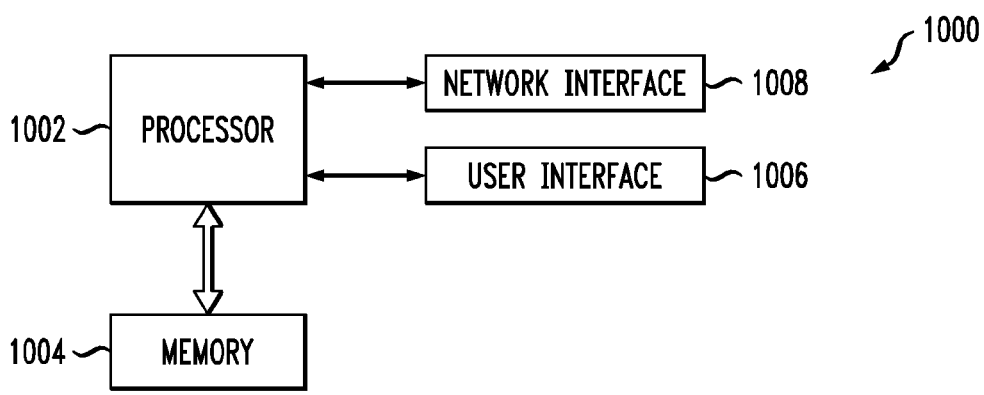
FIG. 10 is a block diagram of a processing device which implements the steps of the flow diagram of FIG. 9.

FIG. 10 shows one possible implementation of such a processing device 1000, suitable for implementing the steps of the homing process of FIG. 9. The processing device 1000 comprises a processor 1002 coupled to a memory 1004. The processor 1002 may comprise, for example, a microprocessor, central processing unit, digital signal processor, application-specific integrated circuit, or other type of processing element, as well as combinations of multiple such elements. The memory 1004 may comprise, for example, random access memory, read-only memory, optical or magnetic storage devices, or other types of storage elements, in any combination. The memory may be viewed as an example of what is more generally referred to herein as a machine-readable storage medium. The memory may be used to store, in addition to instructions or other program code for implementing the homing process, information utilized in the homing process, such as, for example, one or more function hierarchies of the type described above.

Also coupled to the processor 1002 are a user interface 1006 and a network interface 1008. The user interface 1006 may comprise, for example, a graphical user interface provided by a display monitor operating in combination with data entry elements such as a keyboard and mouse. The network interface 1008 may interface the device 1000 to a network or other system element, for example, in order to obtain inputs such as those applied to steps 900 and 904 in the FIG. 9 embodiment. The processing device 1000 may further include other elements not explicitly shown in the figure, but commonly included in conventional implementations of such devices.

A processing device of the type shown in FIG. 10 can be implemented within a given communication system, for example, as one or more operator terminals of the system, or as a separate stand-alone device utilized in designing or otherwise configuring the system.

The illustrative embodiments described above advantageously allow user nodes to be homed to network nodes in a particularly efficient manner, even in complex architectures such as IMS networks, thereby improving system performance. Although particularly useful with IMS networks, the techniques described herein can be applied to a wide variety of other types of communication systems, using any of a number of different communication functions and protocols.

It should again be emphasized that the above-described embodiments are intended to be illustrative only. For example, the particular user node homing techniques, and the associated criteria for arranging network node functions into hierarchies and selecting particular network nodes for assignment to particular user nodes, may be varied to accommodate the needs of a given implementation. Also, the particular network and processing device configurations, and user node and network node functionality, can be varied in alternative embodiments. These and numerous other alternative embodiments within the scope of the following claims will be readily apparent to those skilled in the art.

We claim:

1. A processor-implemented method of homing user nodes to network nodes in a communication system, comprising the steps of:

determining a function hierarchy for functions provided by the network nodes;

starting with a function at an initial level of the function hierarchy, applying at least one predetermined criterion to assign a given user node to a particular network node providing that function;

proceeding through one or more additional levels of the function hierarchy to assign the given user node to at least one additional network node providing at least one other function identified in the one or more additional levels; and repeating the applying and proceeding steps for one or more additional user nodes until each of the user nodes is homed to one or more of the network nodes providing all of its required functions.

2. The method of claim 1 wherein the function hierarchy is determined by arranging the functions in one or more parent-child relationships based on message flow between at least a subset of the functions.

3. The method of claim 1 wherein the function hierarchy comprises a plurality of parent-child relationships each associated with a corresponding functional plane of the network nodes.

4. The method of claim 3 wherein the functional planes include one or more of a control plane, a media plane, an application plane and a support systems plane.

5. The method of claim 4 wherein the parent-child relationship for the control plane comprises a P-CSCF function as a parent having an S-CSCF function as its child.

6. The method of claim 5 wherein the parent-child relationship for the control plane further comprises the S-CSCF function as a parent having an I-CSCF function as its child.

7. The method of claim 6 wherein the parent-child relationship for the control plane further comprises MRFC and BGCF functions as children of the parent S-CSCF function.

8. The method of claim 6 wherein the parent-child relationship for the control plane further comprises the BGCF function as a parent having an MGCF function as its child.

9. The method of claim 4 wherein the parent-child relationship for the media plane comprises MRFP and MGW functions as separate parents each with no children.

10. The method of claim 4 wherein the parent-child relationship for the application plane comprises an AS function as a child of a parent S-CSCF function.

11. The method of claim 4 wherein the parent-child relationship for the support systems plane comprises HSS and DNS functions as children of a parent S-CSCF function.

12. The method of claim 1 wherein the predetermined criteria utilized to assign the given user node to one of the network nodes comprises throughput-weighted distance.

13. The method of claim 1 further including the step of segmenting the user nodes into sets of user nodes and further wherein assignment of the user nodes to network nodes is performed on a per-set basis.

14. The method of claim 13 wherein the sets of user nodes are ranked based on total traffic associated with their respective required functions, and the particular set of user nodes having the highest total traffic is assigned first among the sets of user nodes.

15. A machine-readable storage medium having encoded therein machine-executable instructions that when executed implement the steps of the method of claim 1.

16. An apparatus for use in homing user nodes to network nodes in a communication system, the apparatus comprising:

a processing device, the processing device comprising a processor and a memory coupled to the processor;

wherein the memory is configured to store information characterizing a function hierarchy for functions provided by the network nodes; and wherein the processing device is operative under control of the processor to, starting with a function at an initial level of the function hierarchy, apply at least one predetermined criterion to assign a given user node to a particular network node providing that function; to proceed through one or more additional levels of the function hierarchy to assign the given user node to at least one additional network node providing at least one other function identified in the one or more additional levels; and to repeat the applying and proceeding operations for one or more additional user nodes until each of the user nodes is homed to one or more of the network nodes providing all of its required functions.

17. The apparatus of claim 16 wherein the processing device comprises an operator terminal of the system.

18. The apparatus of claim 16 wherein the processing device comprises a computer implementing a network design software tool.

19. A communication system comprising:

a plurality of user nodes; and a plurality of network nodes configured to provide functions required by the network nodes;

wherein the user nodes are homed to the network nodes by determining a function hierarchy for functions provided by the network nodes; starting with a function at an initial level of the function hierarchy, applying at least one predetermined criterion to assign a given user node to a particular network node providing that function; proceeding through one or more additional levels of the function hierarchy to assign the given user node to at least one additional network node providing at least one other function identified in the one or more additional levels; and repeating the applying and proceeding steps for one or more additional user nodes until each of the user nodes is homed to one or more of the network nodes providing all of its required functions.

20. The communication system of claim 19 wherein at least a portion of the user nodes and the network nodes comprise elements of an IMS network.

\* \* \* \* \*